(12) United States Patent
Horikawa (10) Patent No.: US 12,452,516 B2
(45) Date of Patent: Oct. 21, 2025

(54) IMAGE PICKUP APPARATUS CAPABLE OF PROCESSING SUBJECT DETECTION IN MULTIPLE-EXPOSURE IMAGE WITH HIGH PRECISION AND HIGH SPEED, CONTROL METHOD FOR IMAGE PICKUP APPARATUS, AND STORAGE MEDIUM

(71) Applicant: CANON KABUSHIKI KAISHA, Tokyo (JP)

(72) Inventor: Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/461,240

(22) Filed: Sep. 5, 2023

(65) Prior Publication Data
US 2024/0089578 A1   Mar. 14, 2024

(30) Foreign Application Priority Data
Sep. 8, 2022  (JP) ................................. 2022-143197

(51) Int. Cl.
| | |
|---|---|
| *H04N 23/61* | (2023.01) |
| *H04N 23/60* | (2023.01) |
| *H04N 23/67* | (2023.01) |
| *H04N 23/73* | (2023.01) |

(52) U.S. Cl.
CPC ............ *H04N 23/61* (2023.01); *H04N 23/64* (2023.01); *H04N 23/672* (2023.01); *H04N 23/73* (2023.01)

(58) Field of Classification Search
CPC ...... H04N 23/61; H04N 23/64; H04N 23/672; H04N 23/73; H04N 23/959
See application file for complete search history.

(56) References Cited

U.S. PATENT DOCUMENTS

2017/0310879 A1* 10/2017 Takayama ............ H04N 23/672
2021/0195085 A1*  6/2021 Miyake .................. G06N 3/045

FOREIGN PATENT DOCUMENTS

| JP | 2002027315 A | 1/2002 |
|---|---|---|
| JP | 2021132369 A | 9/2021 |

* cited by examiner

*Primary Examiner* — Ahmed A Berhan
(74) *Attorney, Agent, or Firm* — Canon U.S.A., Inc. IP Division (57) ABSTRACT

An image pickup apparatus capable of processing subject detection in a multiple-exposure image with high accuracy and high speed is provided. The image pickup apparatus includes at least one processor, and a memory coupled to the processor storing instructions that, when executed by the processor, cause the processor to function as an acquisition unit to acquire images of a plurality of frames, a synthesis unit to synthesize the images of the plurality of frames to generate a multiple-exposure image, a first detection unit to detect at least one or more subjects with respect to at least one of the images of the plurality of frames, a determination unit to determine a subject type of a main subject of the multiple-exposure image based on a detection result obtained by the first detection unit, and a second detection unit to detect a subject of the determined subject type in the multiple-exposure image.

9 Claims, 10 Drawing Sheets

FIG. 3A
IN-FOCUS

FIG. 3B
BACK FOCUS

FIG. 3C
FRONT FOCUS

SUBJECT DETECTION INFORMATION

| INDEX |
|---|
| INDEX OF PREVIOUS FRAME |
| COORDINATE POSITION |
| SIZE |
| DETECTION RELIABILITY |
| SUBJECT TYPE |

IMAGE PICKUP APPARATUS CAPABLE OF PROCESSING SUBJECT DETECTION IN MULTIPLE-EXPOSURE IMAGE WITH HIGH PRECISION AND HIGH SPEED, CONTROL METHOD FOR IMAGE PICKUP APPARATUS, AND STORAGE MEDIUM

BACKGROUND OF THE DISCLOSURE

Field of the Disclosure

The present disclosure relates to an image pickup apparatus, a control method for the image pickup apparatus, and a storage medium, and more particularly relates to an image pickup apparatus that performs subject detection in a multiple-exposure image, a control method for the image pickup apparatus, and a storage medium.

Description of the Related Art

Conventionally, in an image pickup apparatus such as a digital camera, a technique for acquiring a multiple-exposure image by performing exposure a plurality of times is known.

For example, Japanese Laid-Open Patent Publication (kokai) No. 2002-27315 discloses a camera system that extracts a feature amount of a subject from a multiple-exposure image acquired by an image pickup apparatus and performs subject detection in the multiple-exposure image based on the extracted feature amount.

In recent years, technology for performing such subject detection based on machine learning has been disclosed, but there is an issue when the number of types of subjects to be detected is increased, the number of types of dictionary data increases, and the subject detection processing time increases due to an increase in the amount of computation.

In order to solve such an issue, Japanese Laid-Open Patent Publication (kokai) No. 2021-132369 proposes an apparatus capable of performing stable subject detection while reducing the amount of computation by switching dictionary data of a subject to be detected in a subsequent frame in response to the type of a subject detected in a certain frame.

However, in the case that the subject detection is performed by applying the technique disclosed in Japanese Laid-Open Patent Publication (kokai) No. 2021-132369, it may be difficult to detect a subject of a subject type, which does not exist in the previous frame, in the subsequent frame.

SUMMARY OF THE DISCLOSURE

The present disclosure provides an image pickup apparatus capable of processing subject detection in a multiple-exposure image with high accuracy and high speed, a control method for the image pickup apparatus, and a storage medium.

Accordingly, the present disclosure provides an image pickup apparatus comprising at least one processor, and a memory coupled to the processor storing instructions that, when executed by the processor, cause the processor to function as an acquisition unit to acquire images of a plurality of frames, a synthesis unit to synthesize the images of the plurality of frames to generate a multiple-exposure image, a first detection unit to detect at least one or more subjects with respect to at least one of the images of the plurality of frames, a determination unit to determine a subject type of a main subject of the multiple-exposure image based on a detection result obtained by the first detection unit, and a second detection unit to detect a subject of the determined subject type with respect to the multiple-exposure image.

According to the present disclosure, it is possible to process the subject detection in the multiple-exposure image with high accuracy and high speed.

Further features of the present disclosure will become apparent from the following description of exemplary embodiments with reference to the attached drawings.

DESCRIPTION OF THE EMBODIMENTS

The present disclosure will now be described in detail below with reference to the accompanying drawings showing embodiments thereof.

Hereinafter, embodiments of the present disclosure will be described in detail. It should be noted that constituent elements described in the embodiments merely represent exemplary embodiments of the present disclosure, and the scope of the present disclosure is not limited thereto.

Hereinafter, a first embodiment of the present disclosure will be described.

Figure 1:
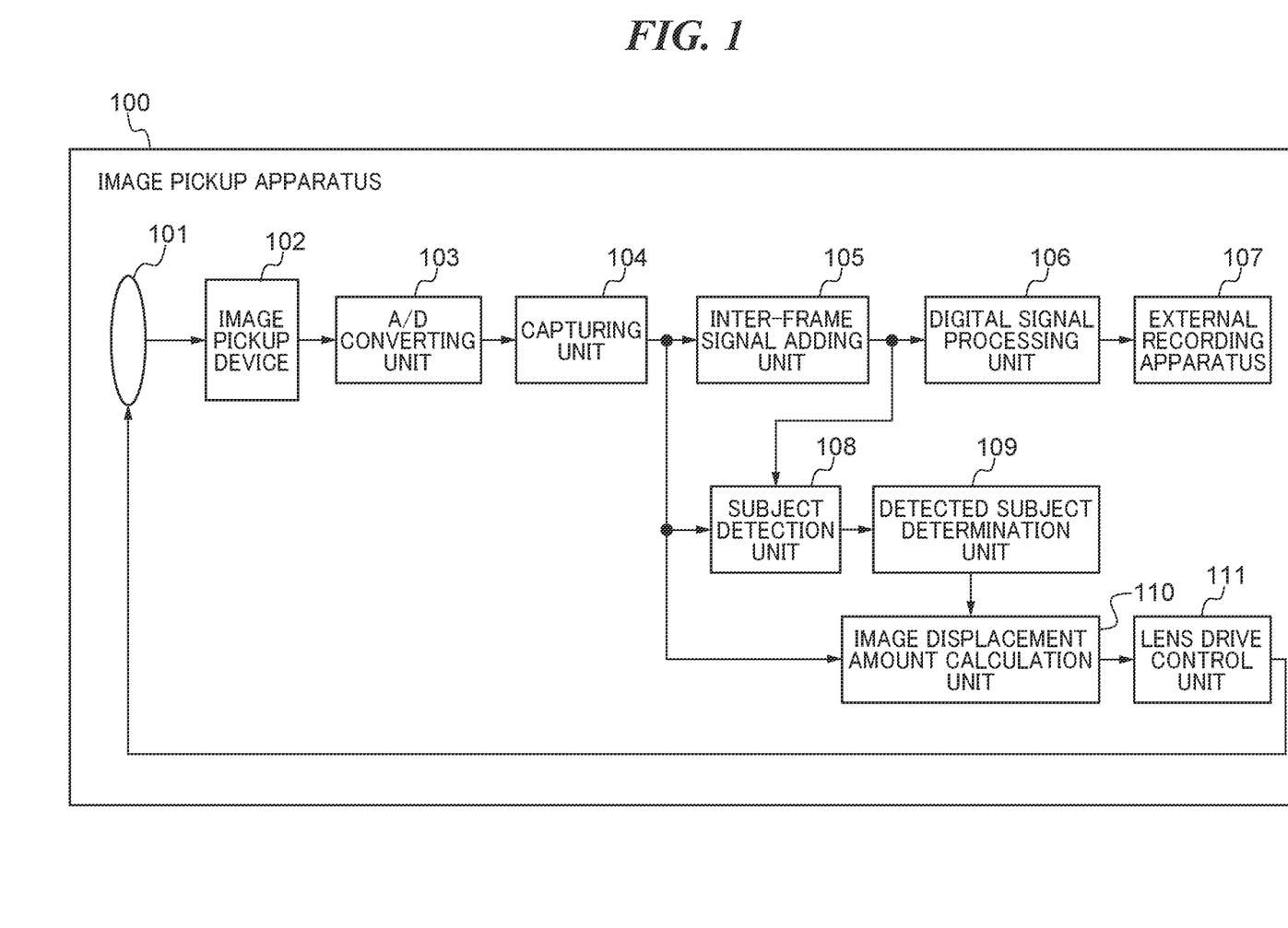
FIG. 1 is a block diagram that shows a hardware configuration of an image pickup apparatus according to a first embodiment of the present disclosure.

FIG. 1 is a block diagram that shows a hardware configuration of an image pickup apparatus 100 according to the first embodiment of the present disclosure.

It should be noted that blocks not directly related to the features of the present disclosure are not shown in FIG. 1.

As shown in FIG. 1, the image pickup apparatus 100 includes an optical system unit 101, an image pickup device 102, an A/D converting unit 103, a capturing unit 104, an inter-frame signal adding unit 105, a digital signal processing unit 106, and a subject detection unit 108. In addition, the image pickup apparatus 100 includes a detected subject determination unit 109, an image displacement amount calculation unit 110, and a lens drive control unit 111.

The optical system unit 101 includes an optical lens group including a focusing lens for adjusting focus, a shutter, a diaphragm, a lens control unit, etc., and is driven based on an output of the lens drive control unit 111. It should be noted that, in FIG. 1, only the focusing lens among the constituent elements of the optical system unit 101 is shown, and the other constituent elements are not shown.

The lens drive control unit 111 outputs a signal for driving the focusing lens included in the optical system unit 101 to the optical system unit 101 according to a distance measurement calculation result from the image displacement amount calculation unit 110.

The image pickup device 102 is a solid-state image pickup device, in which a plurality of unit pixel cells 200 (see FIG. 2A) is arranged in a two-dimensional matrix, and exposure control of the image pickup device 102 is performed by using the shutter and the diaphragm member that are included in the optical system unit 101. In the first embodiment of the present disclosure, as shown in FIG. 2B, the plurality of unit pixel cells 200 is arranged in a two-dimensional matrix, in which the N unit pixel cells are arranged in an X direction and the M unit pixel cells are arranged in a Y direction, more specifically, the plurality of unit pixel cells 200 is arranged in a Bayer array.

Figure 2A:
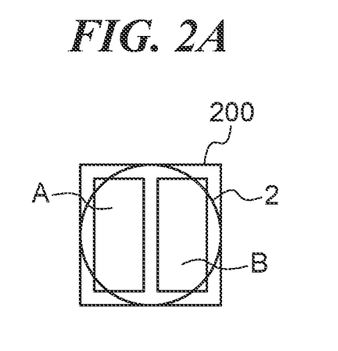
FIGS. 2A and 2B are diagrams that show a structure of a unit pixel cell constituting an image pickup device shown in FIG. 1, and an array of the unit pixel cells in the image pickup device.
Figure 2B:
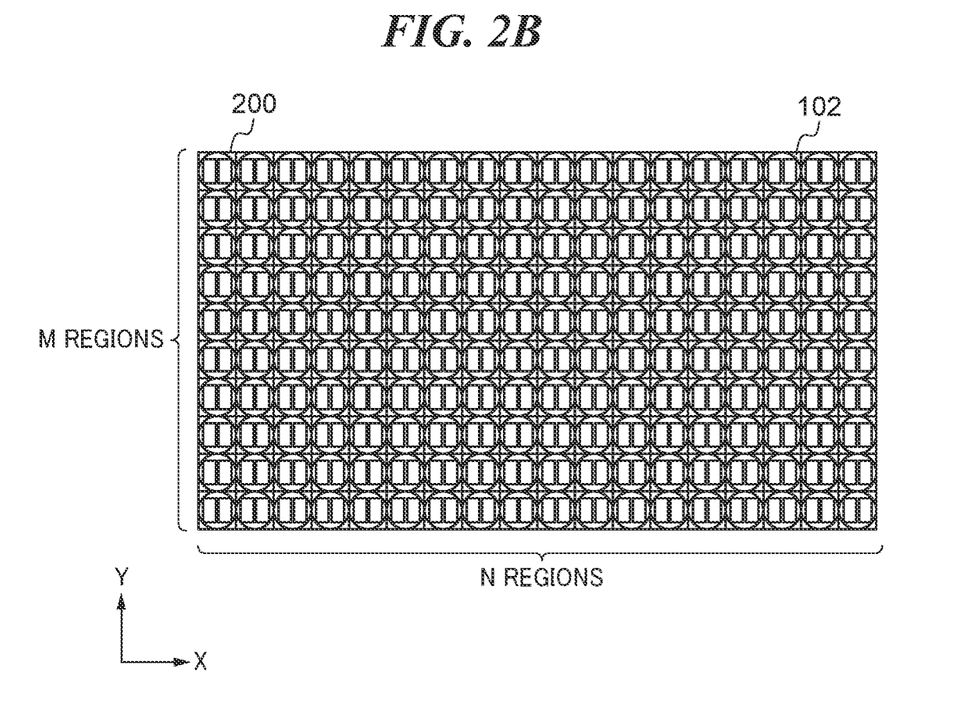

As shown in FIG. 2A, the unit pixel cell 200 includes a microlens 2, and divided pixels A and B having an image pickup device structure including a photodiode (hereinafter, referred to as "PD").

The divided pixels A and B are divided PDs that take in incident light through the same microlens 2, and it is possible to obtain pupil-divided images by using outputs that change depending on the arrangement of the divided PDs. Hereinafter, an image obtained from the divided pixels A is referred to as "an A image", and an image obtained from the divided pixels B is referred to as "a B image".

Returning to FIG. 1, the A/D converting unit 103 performs an analog signal processing by using an analog signal processing unit (not shown), and then converts analog electrical signals outputted from the image pickup device 102 into digital electrical signals (pixel signals), and outputs the digital electrical signals to the capturing unit 104. It should be noted that the analog signal processing unit (not shown) includes a CDS circuit that removes noises on a transmission path, a non-linear amplifier circuit, etc.

The capturing unit 104 (an acquisition unit) judges a valid period and a type of the pixel signals, acquires respective pixel signals of the A image and the B image (an image of a frame), and outputs them to the inter-frame signal adding unit 105, the subject detection unit 108, and the image displacement amount calculation unit 110. The capturing unit 104 acquires images of a plurality of frames constituting a multiple-exposure image.

The inter-frame signal adding unit 105 adds together the pixel signals of the current frame outputted from the capturing unit 104 and the pixel signals up to the previous frame stored in a volatile memory (a DRAM or the like) (not shown), and outputs the result of addition to the digital signal processing unit 106 and the subject detection unit 108.

Specifically, the inter-frame signal adding unit 105 (a synthesis unit) executes the following processing. For the first frame for which multiple exposure is instructed, pixel signals (a first image) are/is outputted to a volatile memory (not shown) without performing addition of signals in a frame (time-axis) direction. For the second frame, while reading out the pixel signals stored in the volatile memory (not shown), the pixel signals outputted from the capturing unit 104 are added together and written back to the volatile memory (not shown). The same operation is performed for the third and subsequent frames. For the last frame at which a predetermined number of frames has been reached, a composite image (a multiple-exposure image) obtained by the addition of the pixel signals described above is outputted to the digital signal processing unit 106 and the subject detection unit 108.

The digital signal processing unit 106 performs an addition processing between the divided pixels with respect to the A image and the B image that are inputted in the Bayer array, and performs digital signal processes such as a synchronization processing, a gamma processing, and a noise reduction processing. Thereafter, the digital signal processing unit 106 converts image data, with respect to which the digital signal processes have been performed, into compressed image data such as compressed image data in JPEG format, outputs the compressed image data to an external recording apparatus 107, and records it in the external recording apparatus 107. It should be noted that techniques of the synchronization processing, the gamma processing, the noise reduction processing, and JPEG compression are not directly related to the present disclosure, and thus detailed descriptions thereof will not be provided.

By performing the processing in this manner, it becomes possible to obtain the multiple-exposure image.

The subject detection unit 108 (functioning as not only a first detection unit but also a second detection unit) sets dictionary data with respect to the first image outputted from the capturing unit 104 and the composite image outputted from the inter-frame signal adding unit 105 based on an instruction from a system control unit (not shown), and performs subject detection. Furthermore, the subject detection unit 108 adds (provides) detection information regarding the detected subject to an image (the first image or the composite image) that is a target of the subject detection, and outputs the detection information to the detected subject determination unit 109.

The subject detection performed by the subject detection unit 108 will be specifically described with reference to FIGS. 5A and 5B.

Figure 5A:
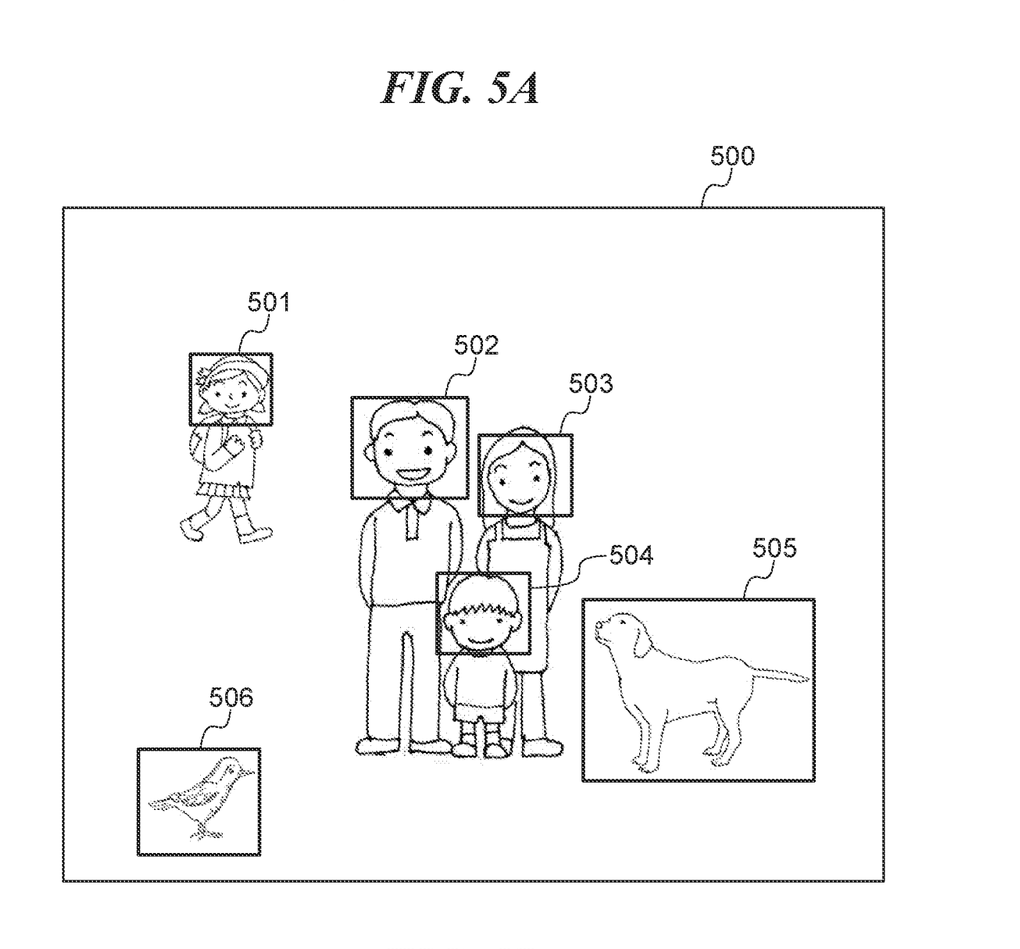
FIGS. 5A and 5B are diagrams for explaining subject detection performed by a subject detection unit shown in FIG. 1.
Figure 5B:
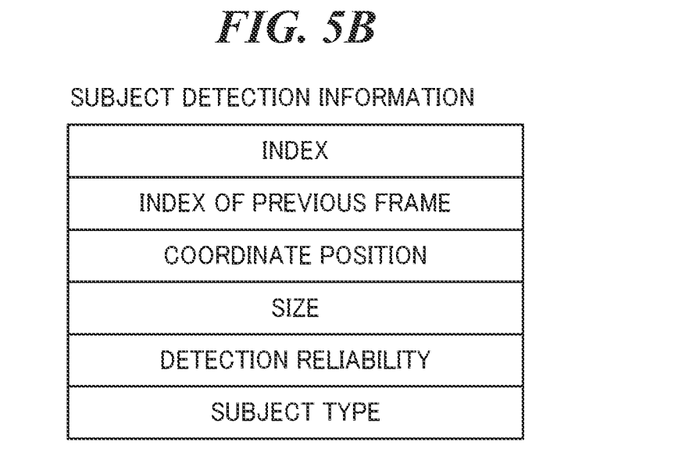

FIG. 5A is a diagram that shows an example of a field angle region 500 of the image (the first image or the composite image) that is the target of the subject detection. A plurality of subjects exists in the field angle region 500, that is, subjects 501 to 504 are people, a subject 505 is a dog, and a subject 506 is a bird.

When detecting the subjects 501 to 506 from the field angle region 500, the subject detection unit 108 generates information (hereinafter, referred to as "detection information") for specifying each of the subjects 501 to 506 shown in FIG. 5B. Here, for each of the subjects 501 to 506, an index thereof, an index associated with a case that the same subject exists in the previous frame, a detected coordinate position, and a size are added (assigned) as the detection information. It should be noted that the coordinate position included in the detection information is specifically a coordinate position of the upper left end of a rectangular detection frame indicating the position of each of the subjects 501 to 506. Further, the size included in the detection information is specifically the width and the height of the rectangular detection frame.

In addition, the detection information generated by the subject detection unit 108 (a subject type judgement unit) also includes information on the detection reliability and the subject type of each of the subjects 501 to 506. The detection reliability is information indicating the degree of reliability when the subject detection unit 108 detects a subject. For example, even for the same subject, the subject detection unit 108 sets the detection reliability of a frame, in which a face is facing backward or sideways, to a lower value than that of a frame, in which the face is facing forward. The subject type is information indicating what the types (for example, a person, a dog, a bird, etc.) of the subjects 501 to 506 are. The detection information may further include part information such as a pupil part, the entire face, the profile, and the head of each detected subject.

In the first embodiment of the present disclosure, the subject detection performed by the subject detection unit 108 is performed by using a subject detector that is a learned model. The subject detector is subjected in advance to machine learning based on learning data (training data) called dictionary data corresponding to the subject type. However, in order to detect subjects of a plurality of subject types from an image that is the target of the subject detection in one-time subject detection performed by the subject detector, a huge subject detector is required. Therefore, in the first embodiment of the present disclosure, the detection of the subjects of the plurality of subject types is performed by using time division and by using a plurality of relatively small subject detectors subjected to machine learning based on dictionary data of different subject types.

Specifically, the subject detection unit 108 performs a subject detection processing with respect to the first image outputted from the capturing unit 104 by using the time division and by using the plurality of subject detectors subjected to the machine learning based on the dictionary data of different subject types. On the other hand, the subject detection processing is performed with respect to the composite image outputted from the inter-frame signal adding unit 105 by using only the subject detectors subjected to the machine learning based on the dictionary data of each subject type selected by the detected subject determination unit 109 among the plurality of subject detectors.

It should be noted that, since more subject detectors are used for the subject detection with respect to the first image than for the subject detection with respect to the composite image, priority may be given to speed and power over accuracy. For example, when performing the subject detection with respect to the first image, the subject detection unit 108 (a reduction unit) may generate a reduced image obtained by reducing the image size of the first image and may input the reduced image into the subject detectors.

Returning to FIG. 1, the detected subject determination unit 109 (a determination unit) selects a subject detection type for the composite image based on a result of the subject detection of the first image and the detection information of each subject outputted from the subject detection unit 108, and notifies the selected subject detection type to the system control unit (not shown). Furthermore, the detected subject determination unit 109 selects a main subject and notifies a subject region of the main subject to the image displacement amount calculation unit 110.

The selection of the subject type performed by the detected subject determination unit 109 for the subject detection processing with respect to the composite image described above is performed based on a priority subject type that is set in advance by a user.

For example, the user performs the selection and setting of the priority subject type by using an operation unit (not shown) of the image pickup apparatus 100 before photographing. Next, the detected subject determination unit 109 confirms whether or not a subject of the priority subject type selected and set by the user is included in a plurality of subjects detected by the subject detection unit 108.

In a case that, as a result of the confirmation, the subject of the priority subject type is included in the plurality of subjects detected by the subject detection unit 108, the detected subject determination unit 109 analogizes the subject of the priority subject type as the main subject, and sets the subject type for the subject detection processing with respect to the composite image as a subject type including the priority subject type.

Furthermore, in a case that no subject is detected by the subject detection unit 108, the detected subject determination unit 109 analogizes the subject of the priority subject type as the main subject, and sets the subject type for the subject detection processing with respect to the composite image as the priority subject type.

On the other hand, in a case that the subject is detected by the subject detection unit 108 but the priority subject is not included therein, the detected subject determination unit 109 analogizes the subject as the main subject in response to the position of the subject detected by the subject detection unit 108. For example, the detected subject determination unit 109 analogizes the subject in a position closest to the image pickup apparatus 100 as the main subject. The detected subject determination unit 109 then sets the subject type for the subject detection processing with respect to the composite image as a subject type including the subject type of the main subject.

The image displacement amount calculation unit 110 calculates an image displacement amount between the A image and the B image, which are outputs of the capturing unit 104, performs a distance measurement calculation based on the calculated image displacement amount, and outputs the result of the distance measurement calculation (the distance measurement calculation result) to the lens drive control unit 111. The lens drive control unit 111 calculates a defocus amount based on the distance measurement calculation result outputted from the image displacement amount calculation unit 110, drives the focusing lens of the optical system unit 101 based on the defocus amount, and performs a focusing operation.

The image displacement amount between the A image and the B image is calculated for each region of the plurality of unit pixel cells 200 arranged in the two-dimensional matrix shown in FIG. 2B, that is, for each rectangular region obtained by dividing the image pickup device 102 into N×M regions.

Among the N×M divided rectangular regions, the range and position of the rectangular regions used for the distance measurement calculation performed by the image displacement amount calculation unit 110 are determined in response to the output of the detected subject determination unit 109 of the previous frame. That is, the image displacement amount calculation unit 110 determines a rectangular region located at a position where the subject exists in the previous frame among the N×M rectangular regions as a region to be used for the distance measurement calculation of the current frame.

By performing the control in this way, the lens drive control unit 111 becomes capable of performing the drive control of the focusing lens with low latency without waiting for the processing of the detected subject determination unit 109 of the current frame.

Here, a principle of focus detection (defocus amount calculation) using a phase difference obtained by utilizing the divided pixels A and B of the unit pixel cell 200 shown in FIGS. 2A and 2B will be described with reference to FIGS. 3A, 3B, and 3C.

Figure 3A:
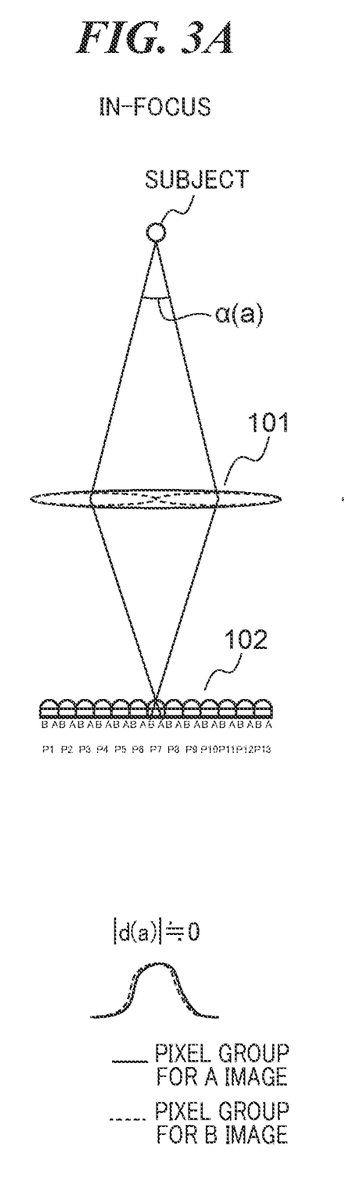
FIGS. 3A, 3B, and 3C are diagrams for explaining a principle of focus detection utilizing a phase difference obtained by using divided pixels of the unit pixel cell shown in FIGS. 2A and 2B.
Figure 3B:
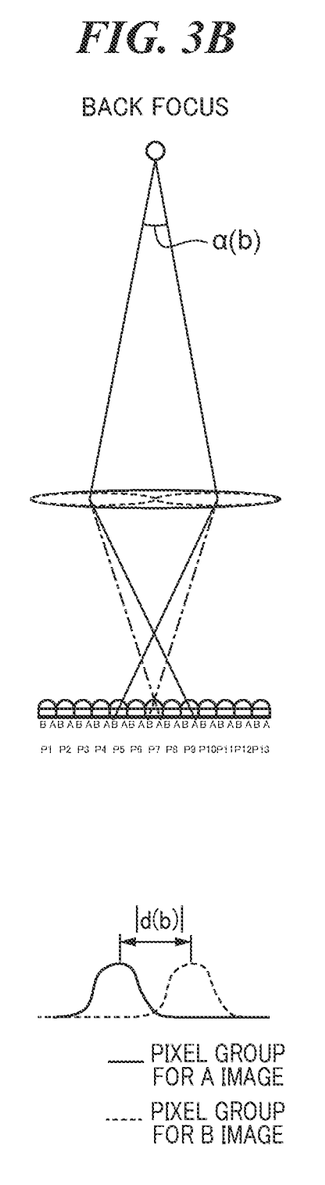
Figure 3C:
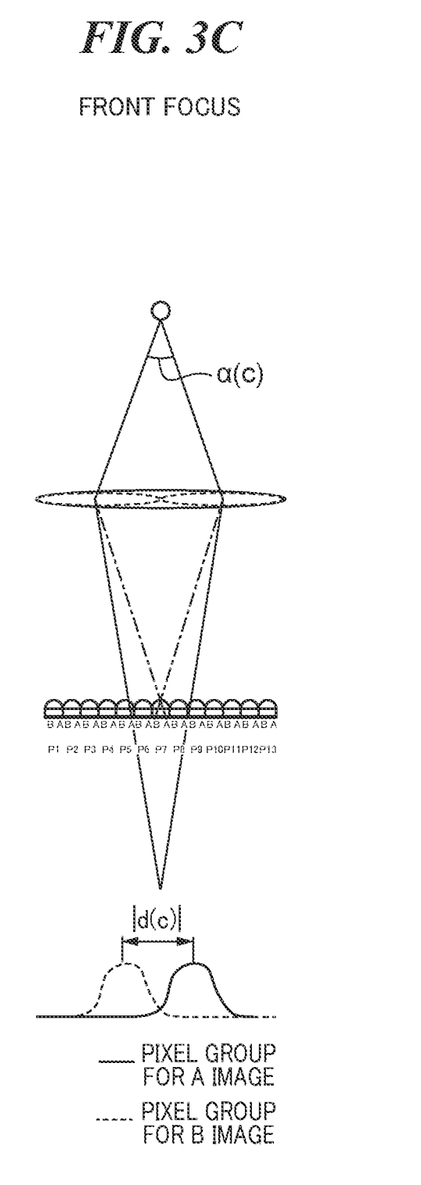

As shown in FIGS. 2A and 2B, although the image pickup device 102 includes the plurality of unit pixel cells 200 arranged therein, in order to simplify the description, in FIGS. 3A, 3B, and 3C, only the unit pixel cells 200P1 to 200P13 among the plurality of unit pixel cells 200 constituting the image pickup device 102 are used.

The unit pixel cell 200P7 is a unit pixel cell located in a central position P7 of the image pickup device 102. Furthermore, the unit pixel cells 200P1 to 200P6 are six unit pixel cells adjacent to each other in a −X direction of the unit pixel cell 200P7, and the unit pixel cells 200P8 to 200P13 are six unit pixel cells adjacent to each other in a +X direction of the unit pixel cell 200P7.

The unit pixel cells 200P1 to 200P13 include the divided pixels A and B which are arranged separately under the microlenses 2 provided respectively thereto. It is known from Japanese Laid-Open Patent Publication (kokai) No. 2002-27315 that the divided pixels A and B arranged under the respective microlenses 2 are pixels subjected to pupil division with the microlenses 2 serving as exit pupils.

At the time of performing the distance measurement, first, A image pixel signals and B image pixel signals that are outputted from the respective divided pixels A and B of the unit pixel cells 200P1 to 200P13 are combined in the X direction, and the A image and the B image are generated as outputs of identical-color unit pixel cell groups. Next, the displacement in the corresponding points of each of the A image and the B image is obtained by sum of absolute difference (SAD) calculation which is one of correlation calculations. The result of the SAD calculation is obtained by the following Equation (1).

$$C = \Sigma |YAn - YBn|  \quad \text{Equation (1)}$$

In this case, n is the number of the microlenses in a range in which a horizontal SAD calculation (the correlation calculation) is performed. In addition, values for when the corresponding pixels are displaced with respect to YBn are plotted, and the displacement amount having the smallest value is an in-focus position.

In the case of in-focus (see FIG. 3A), since the position where the optical lens group of the optical system unit 101 forms an image becomes the divided pixels A and B under the microlens 2 located at P7, the A image and the B image outputted from the image pickup device 102 substantially coincide with each other. At this time, an image displacement amount d(a) between the A image and the B image obtained by the correlation calculation is approximated to substantially zero.

In the case of back focus (see FIG. 3B), the position where a photographing lens group (the optical lens group) of the optical system unit 101 forms an image becomes the divided pixel A under the microlens 2 located at P5 for the A image, and becomes the divided pixel B under the microlens 2 located at P9 for the B image. At this time, an image displacement amount d(b) obtained by the correlation calculation is generated between the A image and the B image.

In the case of front focus (see FIG. 3C), the position where the photographing lens group (the optical lens group) of the optical system unit 101 forms an image becomes the divided pixel A under the microlens 2 located at P9 for the A image, and becomes the divided pixel B under the microlens 2 located at P5 for the B image. At this time, an image displacement amount d(c) in a direction opposite to the back focus, which is obtained by the correlation calculation, is generated between the A image and the B image.

This means that, in the case of the in-focus, the divided pixels A and B of the unit pixel cells 200P1 to 200P13 are viewing the same subject. On the other hand, this means that, in the case of the back focus and in the case of the front focus, the respective divided pixels A and B of the unit pixel cells 200P1 to 200P13 are viewing the subject displaced by the image displacement amount d.

The defocus amount can be obtained by a known technique based on the image displacement amount d generated between the A image and the B image obtained by the correlation calculation, and a baseline length, and it becomes possible to perform the focusing operation of focusing on the subject.

Figure 6:
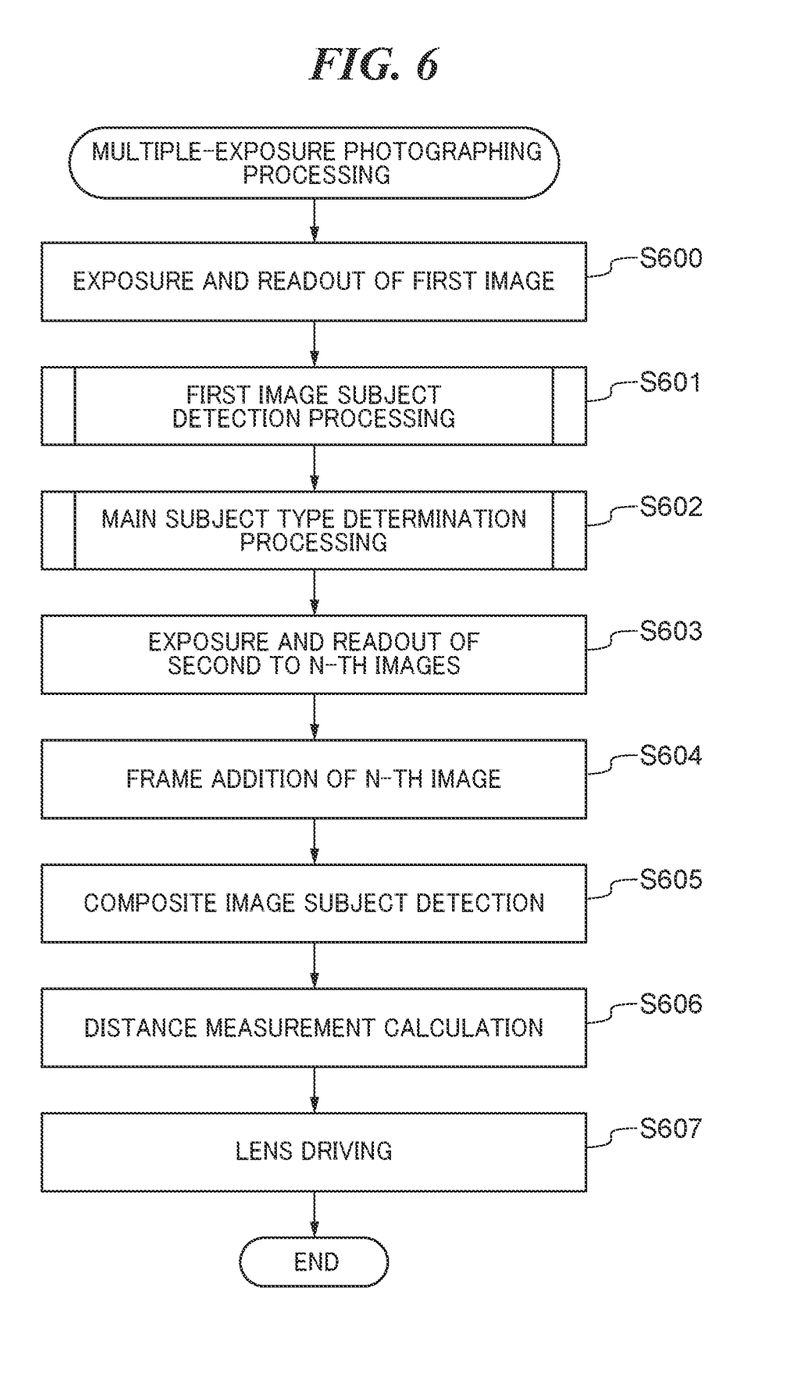
FIG. 6 is a flowchart of a multiple-exposure photographing processing according to the first embodiment of the present disclosure.

FIG. 6 is a flowchart of a multiple-exposure photographing processing according to the first embodiment of the present disclosure. Specifically, the multiple-exposure photographing processing is a processing executed by the system control unit of the image pickup apparatus 100, and is a processing from the start of exposure at the time of multiple-exposure photographing to the completion of lens driving performed by the lens drive control unit 111.

In a step S600, the system control unit exposes and reads out the first image constituting the multiple-exposure image from the image pickup device 102. Thereafter, the system control unit writes out the first image to the volatile memory (not shown) via the inter-frame signal adding unit 105 and inputs the first image to the subject detection unit 108, and advances the multiple-exposure photographing processing to a step S601.

In the step S601, the system control unit executes a first image subject detection processing. Although details of the first image subject detection processing will be described below with reference to FIG. 7, in the first image subject detection processing, the system control unit performs the subject detection with respect to the inputted image by means of the subject detection unit 108 based on the plurality of subject detectors and outputs the obtained detection information to the detected subject determination unit 109, and then advances the multiple-exposure photographing processing to a step S602.

Figure 7:
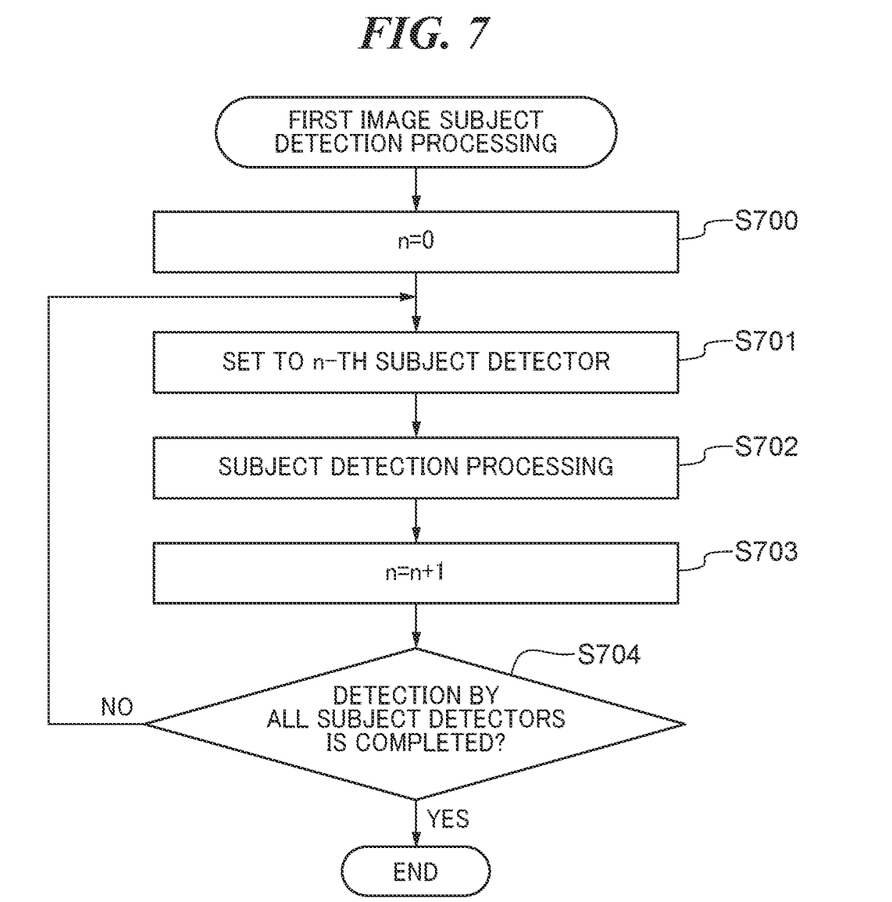
FIG. 7 is a flowchart of a first image subject detection processing performed in a step S601 of FIG. 6 in the first embodiment of the present disclosure.

The first image subject detection processing performed in the step S601 according to the first embodiment of the present disclosure will be described with reference to a flowchart of FIG. 7. The first image subject detection processing is executed by the system control unit (not shown) of the image pickup apparatus 100.

In a step S700, the system control unit initializes the value of n indicating the index numbers of the plurality of subject detectors at 0, and then advances the first image subject detection processing to a step S701.

In the step S701, the system control unit sets the index number of the subject detector used in the subject detection performed by the subject detection unit 108 as n, and advances the first image subject detection processing to a step S702.

In the step S702, the system control unit causes the subject detection unit 108 to perform the subject detection with respect to the output of the capturing unit 104 by using the n-th subject detector, outputs the detection information updated by using the obtained result to the detected subject determination unit 109, and advances the first image subject detection processing to a step S703.

In the step S703, the system control unit increments n so that the subject detection unit 108 performs the subject detection by using the next subject detector, and advances the first image subject detection processing to a step S704.

In the step S704, the system control unit judges whether or not the subject detection performed by all the subject detectors has been completed. In the case that the subject detection performed by all the subject detectors has been completed (YES in the step S704), the system control unit ends the processing of FIG. 7 (the first image subject detection processing), and otherwise (NO in the step S704), the system control unit returns the first image subject detection processing to the step S701.

Returning to FIG. 6, in the step S602, the system control unit executes the main subject type determination processing, and then advances the multiple-exposure photographing processing to a step S603. Although details of the main subject type determination processing will be described below with reference to FIG. 8, in the main subject type determination processing, the detected subject determination unit 109 determines a subject detector to be applied to the composite image based on the detection information outputted from the subject detection unit 108.

The main subject type determination processing performed in the step S602 according to the first embodiment of the present disclosure will be described with reference to a flowchart of FIG. 8.

In a step S800, the system control unit causes the detected subject determination unit 109 to initialize the value of m indicating the index of the detection information at 0, and advances the main subject type determination processing to a step S801.

In the step S801, the system control unit causes the detected subject determination unit 109 to initialize a subject type table storing the subject type of each subject that exists in the field angle region 500, and then advances the main subject type determination processing to a step S802.

In the step S802, the system control unit causes the detected subject determination unit 109 to acquire the subject type from the m-th detection information, and then advances the main subject type determination processing to a step S803.

In the step S803, the system control unit causes the detected subject determination unit 109 to judge whether or not the subject type acquired from the m-th detection information exists in the subject type table. In the case that the subject type acquired from the m-th detection information exists in the subject type table (YES in the step S803), the system control unit advances the main subject type determination processing to a step S805, and on the other hand, in the case that the subject type acquired from the m-th detection information does not exist in the subject type table (NO in the step S803), the system control unit advances the main subject type determination processing to a step S804.

In the step S804, the system control unit causes the detected subject determination unit 109 to add the subject type to the subject type table, and then advances the main subject type determination processing to a step S805.

In the step S805, the system control unit increments m so that the detected subject determination unit 109 acquires the subject type from the next detection information, and then advances the main subject type determination processing to a step S806.

In the step S806, the system control unit causes the detected subject determination unit 109 to judge whether or not the acquisition of the subject types from all the detection information outputted from the subject detection unit 108 has been completed. In the case that the acquisition of the subject types from all the detection information has been completed (YES in the step S806), the system control unit advances the main subject type determination processing to a step S807, and otherwise (NO in the step S806), the system control unit returns the main subject type determination processing to the step S802.

In the step S807, the system control unit causes the detected subject determination unit 109 to confirm whether or not the priority subject type instructed via a user interface (not shown) exists in the subject type table. In the case that the priority subject type instructed via the user interface exists in the subject type table (YES in the step S807), the system control unit advances the main subject type determination processing to a step S808, and on the other hand, in the case that the priority subject type instructed via the user interface does not exist in the subject type table (NO in the step S807), the system control unit advances the main subject type determination processing to a step S809.

In the step S808, the system control unit causes the detected subject determination unit 109 to determine the priority subject type as the subject type of the main subject in the composite image, and sets the subject detector for the priority subject type as the subject detector of the composite image. Thereafter, the system control unit ends the processing of FIG. 8 (the main subject type determination processing).

In the step S809, the system control unit causes the detected subject determination unit 109 to analogize the subject located in the position of the subject in the field angle region 500, for example, located in the position closest to the image pickup apparatus 100 as the main subject, and makes the determination of the subject type of the main subject in the composite image. The system control unit sets the subject detector for the subject type of the main subject as the subject detector of the composite image, and then ends the processing of FIG. 8.

Returning to FIG. 6, in the step S603, the system control unit sequentially performs the exposure and reading out of the second and subsequent images constituting the multiple-exposure image from the image pickup device 102, and advances the multiple-exposure photographing processing to a step S604.

In the step S604, the system control unit causes the inter-frame signal adding unit 105 to perform frame addition of the second and subsequent images constituting the multiple-exposure image to generate the composite image, and then advances the multiple-exposure photographing processing to a step S605.

In the step S605, the system control unit causes the subject detection unit 108 to perform the subject detection with respect to the composite image by using the subject detector determined in the step S602. As a result, the position and size of the main subject detected by the subject detection unit 108 are outputted as a distance measurement region to the image displacement amount calculation unit 110, and then the system control unit advances the multiple-exposure photographing processing to a step S606. It should be noted that, in the case that a plurality of subjects is detected from the composite image, the position of the detected subject in the field angle region 500, for example, the subject closest to the image pickup apparatus 100 is analogized as the main subject.

In the step S606, the system control unit causes the image displacement amount calculation unit 110 to perform the distance measurement calculation for calculating the image displacement amount based on the distance measurement region outputted from the subject detection unit 108, and then advances the multiple-exposure photographing processing to a step S607.

In the step S607, the system control unit causes the lens drive control unit 111 to perform conversion from the image displacement amount calculated in the step S606 into the defocus amount, uses the defocus amount to drive the optical system unit 101, performs the focusing operation, and then ends the processing of FIG. 6 (the multiple-exposure photographing processing).

It should be noted that, in the processing of FIG. 6, although the subject types of all the subjects that exist in the field angle region 500 are determined by using only the first image, the present disclosure is not limited thereto as long as this determination is performed by using at least one image constituting the multiple-exposure image (the composite image). For example, the subject type of all the subjects that exist in the field angle region 500 may be determined by using the second and subsequent images or the image serving as the exposure center.

Figure 8:
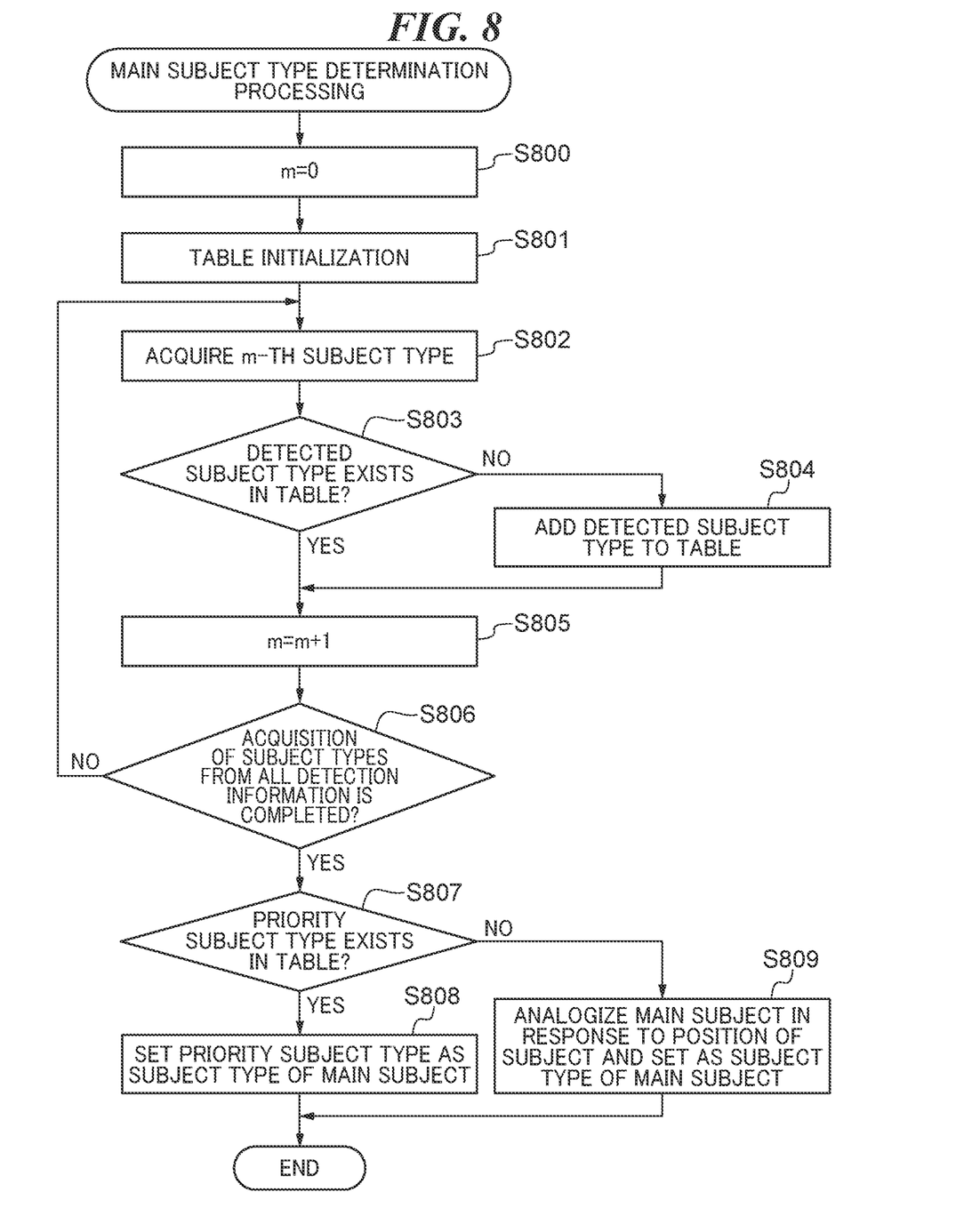
FIG. 8 is a flowchart of a main subject type determination processing performed in a step S602 of FIG. 6 in the first embodiment of the present disclosure.

It should be noted that, in the processing of FIG. 8, although the subject type of the main subject to be detected from the composite image is determined based on the composite image generated and outputted by the inter-frame signal adding unit 105, the present disclosure is not limited to this determination. For example, an image in the process of generating the composite image may be read out from the volatile memory (not shown), and the subject type of the subject to be detected from the composite image may be determined based on the image in the process of generating the composite image. In this case, it becomes possible to judge the subject type of the subject to be detected from the composite image based on an image having a high S/N ratio.

Next, a sequence from exposure to lens drive control of the image pickup apparatus 100 will be described with reference to a timing chart shown in FIG. 4. In the timing chart shown in FIG. 4, a case that a composite image obtained by adding together images of four frames is generated as a multiple-exposure image to facilitate the description will be described. In addition, in the timing chart shown in FIG. 4, the subject detection processing of the first image is performed by using the two subject detectors which have been trained (learned) by using each of two types of dictionary data.

At a time point t400, the image pickup device 102 starts the exposure operation with respect to the first image constituting the multiple-exposure image by means of photoelectric conversion of the incident light formed by the optical system unit 101.

At a time point t401, the image pickup device 102 completes the exposure operation of the first image, and starts the reading-out operation to the capturing unit 104 via the A/D converting unit 103. In addition, the image pickup device 102 starts the exposure operation with respect to the second image constituting the multiple-exposure image.

When the image pickup device 102 completes reading out of the first image to the capturing unit 104 at a time point t402, the capturing unit 104 outputs the first image to the inter-frame signal adding unit 105, the subject detection unit 108, and the image displacement amount calculation unit 110. The inter-frame signal adding unit 105 writes the first image outputted from the capturing unit 104 to a dynamic random access memory (DRAM) (not shown). In addition, the subject detection unit 108 starts the subject detection processing of the first image by using the subject detectors trained (learned) based on first dictionary data. Furthermore, the image pickup device 102 starts reading out of the second image constituting the multiple-exposure image to the capturing unit 104 and starts the exposure operation with respect to a third image constituting the multiple-exposure image.

When the image pickup device 102 completes the reading out of the second image to the capturing unit 104 at a time point t403, the capturing unit 104 outputs the second image to the inter-frame signal adding unit 105, the subject detection unit 108, and the image displacement amount calculation unit 110. The inter-frame signal adding unit 105 adds together the second image outputted from the capturing unit 104 and the first image held in the DRAM (not shown), and performs writing to the DRAM (not shown). Furthermore, the image pickup device 102 starts reading out of the third image constituting the multiple-exposure image to the capturing unit 104 and starts the exposure operation with respect to a fourth image constituting the multiple-exposure image.

At a time point t404, the subject detection unit 108 completes the subject detection processing of the first image by using the subject detectors trained (learned) based on the first dictionary data, and starts the subject detection processing of the first image by using the subject detectors trained based on second dictionary data.

When the image pickup device 102 completes the reading out of the third image to the capturing unit 104 at a time point t405, the capturing unit 104 outputs the third image to the inter-frame signal adding unit 105, the subject detection unit 108, and the image displacement amount calculation unit 110. The inter-frame signal adding unit 105 adds together the third image outputted by the capturing unit 104 and inter-frame added images held in the DRAM (not shown), and performs writing to the DRAM (not shown). Furthermore, the image pickup device 102 starts reading out of the fourth image constituting the multiple-exposure image to the capturing unit 104.

When the image pickup device 102 completes the reading of the fourth image to the capturing unit 104 at a time point t406, the capturing unit 104 outputs the fourth image to the inter-frame signal adding unit 105, the subject detection unit 108, and the image displacement amount calculation unit 110. The inter-frame signal adding unit 105 adds together the fourth image outputted from the capturing unit 104 and the inter-frame added images held in the DRAM (not shown) to generate the multiple-exposure image (the composite image).

At substantially the same timing as the time point t406, the subject detection unit 108 completes the subject detection of the first image by using the subject detectors trained (learned) with the second dictionary data, and the detected subject determination unit 109 starts the main subject type determination processing to determine the main subject of the composite image.

At a time point t407, the detected subject determination unit 109 completes the main subject type determination processing, and notifies the determined subject type of the main subject to the subject detection unit 108. The subject detection unit 108 starts the subject detection with respect to the multiple-exposure image (the composite image) by using the subject detectors trained (learned) based on the subject type dictionary data notified by the detected subject determination unit 109.

At a time point t408, the subject detection unit 108 completes the subject detection with respect to the multiple-exposure image (the composite image), and notifies the position and size of the subject to the image displacement amount calculation unit 110. The image displacement amount calculation unit 110 starts a distance measurement processing based on the position and size of the subject notified by the subject detection unit 108 and the first image outputted from the capturing unit 104.

At a time point t409, the image displacement amount calculation unit 110 completes the distance measurement processing and notifies the distance measurement calculation result to the lens drive control unit 111. The lens drive control unit 111 calculates the defocus amount based on the distance measurement calculation result, and starts driving of the focusing lens of the optical system unit 101 based on the defocus amount.

At a time point t410, the driving of the focusing lens of the optical system unit 101 is completed, and similarly to at the time point t400, the image pickup device 102 starts the exposure operation with respect to the first image constituting the multiple-exposure image, and subsequently repeats the same operation as the operation after the time point t401.

As described above, in in the first embodiment of the present disclosure, before the time point t407 at which the generation of the composite image is completed, the subject detection based on all the dictionary data is performed in advance with respect to at least one image constituting the multiple-exposure image, and the main subject of the composite image based on the detection result is determined. Specifically, a subject detection period based on the first dictionary data is set as a period from the time point t402 to the time point t404, and a subject detection period based on the second dictionary data is set as a period from the time point t404 to the time point t406. Furthermore, a period, during which the main subject of the composite image is determined, is set as a period from the time point t406 to the time point t407.

Thereafter, for the composite image, only the subject detection based on the dictionary data of the determined subject type of the main subject is performed without performing the subject detection based on all the dictionary data performed conventionally, and the distance measurement processing and the lens driving are performed based on the detection result of only the subject detection based on the dictionary data of the determined subject type of the main subject. As a result, it becomes possible to perform the subject detection of the multiple-exposure image highly accurately while reducing the subject detection time with respect to the composite image from the time point t407 to ½ in comparison with the conventional technique.

Figure 4:
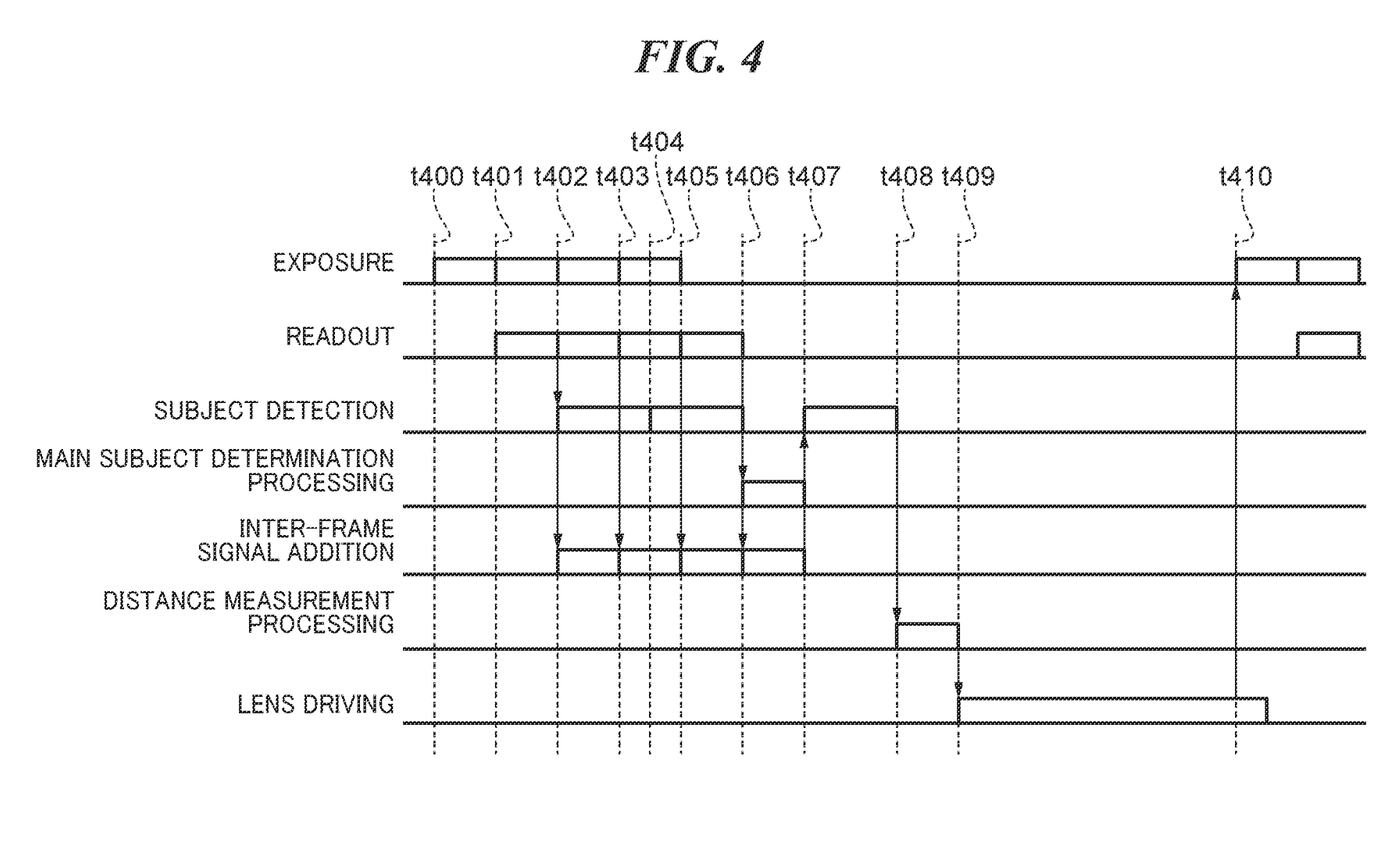
FIG. 4 is a timing chart that shows a sequence from exposure to lens drive control of the image pickup apparatus according to the first embodiment of the present disclosure.

It should be noted that, in the timing chart shown in FIG. 4, in order to facilitate the description, although it has been described that the next processing starts after each processing is completed, actually, the processing may be performed in parallel with the latency of each processing.

Hereinafter, a second embodiment of the present disclosure will be described.

In the first embodiment of the present disclosure, the case has been described in which highly accurate subject detection by using the subject detectors subjected to machine-learning by using a plurality of dictionary data is performed at high speed on the multiple-exposure image. However, the present disclosure is not limited to the subject detection performed by using the subject detectors subjected to machine-learning by using the dictionary data. Therefore, in the second embodiment of the present disclosure, operations when the subject detection of the composite image is performed by using a plurality of templates without using the machine learning will be described with reference to FIGS. 9 and 10.

It should be noted that in the second embodiment of the present disclosure, the same reference numerals are used for the same configurations and the same steps as those in the first embodiment, and redundant descriptions will be omitted.

Figure 9:
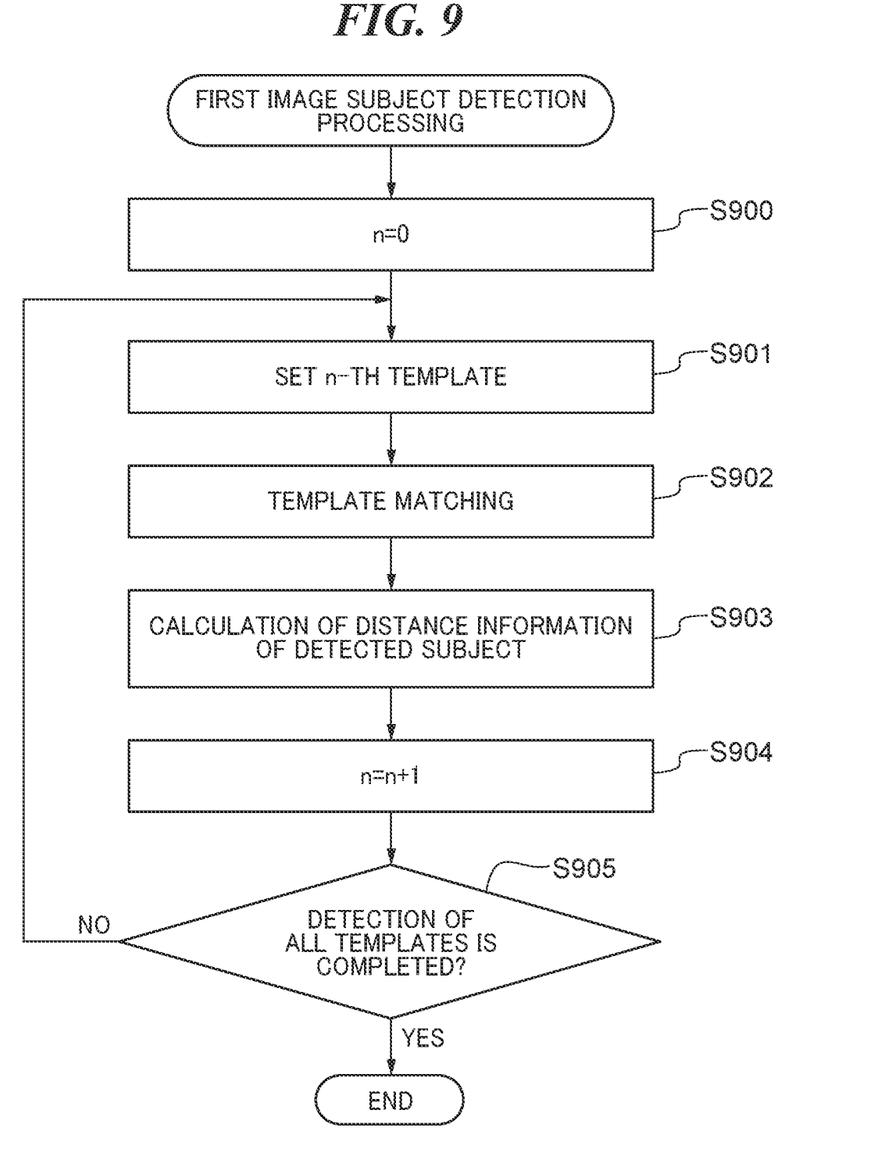
FIG. 9 is a flowchart of a first image subject detection processing performed in the step S601 of FIG. 6 in a second embodiment of the present disclosure.
Figure 10:
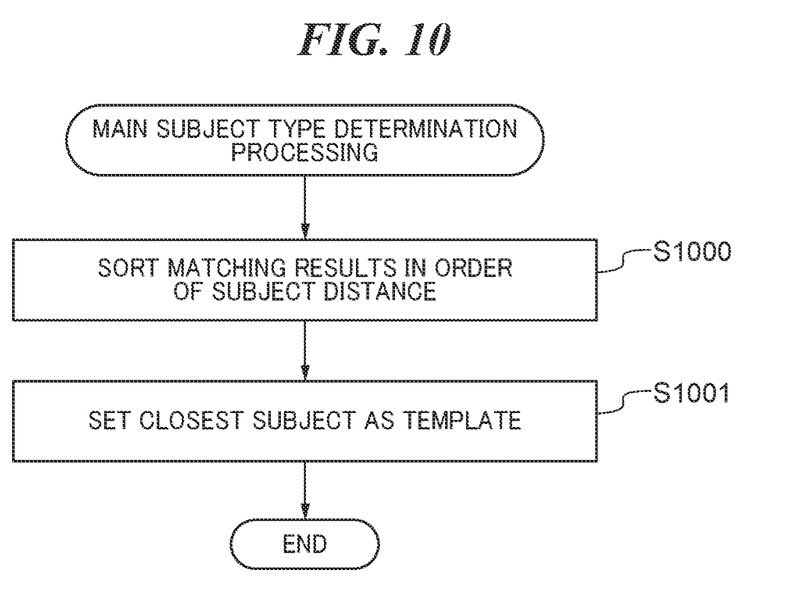
FIG. 10 is a flowchart of a main subject type determination processing performed in the step S602 of FIG. 6 in the second embodiment of the present disclosure.

Flowcharts of FIGS. 9 and 10 correspond to the flowchart (see FIG. 7) of the first image subject detection processing performed in the step S601 of FIG. 6 and the flowchart (see FIG. 8) of the main subject type determination processing performed in the step S602 of FIG. 6 that have been described in the first embodiment, respectively.

In comparison with the first embodiment, in the second embodiment, the detection method for the subject detection unit 108 is changed to a subject detection method using template matching such as SAD.

A first image subject detection processing performed in the step S601 in the second embodiment will be described with reference to the flowchart of FIG. 9. The first image subject detection processing performed in the step S601 in the second embodiment (the first image subject detection processing) is executed by the system control unit (not shown) of the image pickup apparatus 100.

In a step S900, the system control unit sets a value of n indicating index numbers of a plurality of templates to be used for the subject detection to 0, and advances the first image subject detection processing to a step S901.

In the step S901, the system control unit sets the index number of the template used for the subject detection by the subject detection unit 108 to n, and advances the first image subject detection processing to a step S902.

It should be noted that a plurality of pieces of template data is provided for each subject type of each subject detected in the image of the previous frame constituting the multiple-exposure image. For the detection of each subject in the image of the previous frame, artificial intelligence (AI) detection using subject detectors trained (learned) by using machine learning may be used, or contrast detection for judging subject likeness (objects having a difference in contrast) by using color information may be used. In general, simple template matching enables the subject detection at a higher speed and a lower power than the AI detection and the contrast detection. Therefore, the subject detection by using the AI detection, the contrast detection, or the like can be performed at high speed and low power by suppressing the number of times to generate a plurality of multiple-exposure images to one.

In the step S902, the system control unit causes the subject detection unit 108 to perform the subject detection with respect to the output of the capturing unit 104 by means of the template matching using n-th template data. Thereafter, the system control unit outputs the detection information updated by the result obtained by this subject detection to the detected subject determination unit 109, and advances the first image subject detection processing to a step S903. Hereinafter, the subject detected by the subject detection performed in the step S902 is referred to as "a detected subject".

In the step S903, the system control unit causes the detected subject determination unit 109 to extract information on a subject region of the detected subject from the detection information outputted from the subject detection unit 108 in the step S902, and notifies the extracted information to the image displacement amount calculation unit 110. Thereafter, the system control unit causes the image displacement amount calculation unit 110 to calculate distance information on the detected subject based on the information of the subject region notified by the detected subject determination unit 109, adds the distance information to the detection information, and then advances the first image subject detection processing to a step S904.

In the step S904, the system control unit increments n so that the subject detection unit 108 performs the subject detection by means of the template matching using the next template data, and then advances the first image subject detection processing to a step S905.

In the step S905, the system control unit judges whether or not the subject detection by using all the template data has been completed. In the case that the subject detection by using all the template data has been completed (YES in the step S905), the system control unit ends the processing of FIG. 9 (the first image subject detection processing), and otherwise (NO in the step S905), the system control unit returns the first image subject detection processing to the step S901.

Next, a main subject type determination performed in the step S602 in the second embodiment processing (a main subject type determination processing) will be described with reference to the flowchart in FIG. 10.

In a step S1000, the system control unit causes the detected subject determination unit 109 to perform a sorting processing based on the distance information of each detected subject included in the detection information, and then advances the main subject type determination processing to a step S1001.

In the step S1001, the system control unit causes the detected subject determination unit 109 to set template data, in which the subject having the closest distance to the image pickup apparatus 100 has been detected as a result of the sorting processing performed in the step S1000, as template data used for the subject detection with respect to the composite image. Thereafter, the system control unit ends the processing of FIG. 10 (the main subject type determination processing).

As described above, in the second embodiment, before the time point t407 at which the generation of the composite image is completed, the subject detection based on all the template data is performed in advance with respect to at least one image constituting the multiple-exposure image, and the main subject of the composite image is determined based on the detection result of the subject detection based on all the template data. Specifically, a subject detection period based on a first template data is set as the period from the time point t402 to the time point t404, and a subject detection period based on a second template data is set as the period from the time point t404 to the time point t406. Furthermore, a period, during which the main subject of the composite image is determined, is set as the period from the time point t406 to the time point t407.

Thereafter, for the composite image, only the subject detection based on the template data of the determined subject type of the main subject is performed without performing the subject detection based on all the template data performed conventionally, and the distance measurement processing and the lens driving are performed based on the detection result of only the subject detection based on the template data of the determined subject type of the main subject. As a result, it becomes possible to perform the subject detection of the multiple-exposure image highly accurately while reducing the subject detection time with respect to the composite image from the time point t407 to ½ in comparison with the conventional technique.

It should be noted that, similarly to the first embodiment, also in the second embodiment, in the case that the template data, in which the subject is detected, includes the template data of the priority subject type, the detected subject determination unit 109 may analogize the subject of the priority subject type as the main subject.

It should be noted that, in the embodiment of the present disclosure, it is also possible to implement processing in which a program for implementing one or more functions is supplied to a computer of a system or an apparatus via a network or a storage medium, and a system control unit of the system or the apparatus reads out and executes the program. The system control unit may include one or more processors or circuits, and in order to read out and execute executable instructions, the system control unit may include multiple isolated system control units or a network of multiple isolated processors or circuits.

The processor or circuit may include a central processing unit (CPU), a micro processing unit (MPU), a graphics processing unit (GPU), an application-specific integrated circuit (ASIC), and/or a field-programmable gate array (FPGA). In addition, the processor or circuit may include a digital signal processor (DSP), a data flow processor (DFP), or a neural processing unit (NPU).

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-143197, filed on Sep. 8, 2022, which is hereby incorporated by reference herein in its entirety.

What is claimed is:

1. An image pickup apparatus comprising:

at least one processor; and a memory coupled to the processor storing instructions that, when executed by the processor, cause the processor to function as:

an acquisition unit to acquire images of a plurality of frames;

a synthesis unit to synthesize the images of the plurality of frames to generate a multiple-exposure image;

a first detection unit to detect at least one or more subjects with respect to at least one of the images of the plurality of frames, the first detection unit including a subject type judgement unit configured to judge a subject type of the at least one or more subjects;

a determination unit to determine a subject type of a main subject of the multiple-exposure image based on a detection result obtained by the first detection unit, wherein the determination unit determines one of the subject types of the at least one or more subjects judged by the subject type judgement unit as the subject type of the main subject of the multiple-exposure image, and wherein, in a case that a priority subject type set by a user does not exist among the subject types of the at least one or more subjects judged by the subject type judgement unit, the determination unit determines the subject type of the main subject of the multiple-exposure image in response to a subject position of the at least one or more subjects; and a second detection unit to detect a subject of the determined subject type with respect to the multiple-exposure image.

2. The image pickup apparatus according to claim 1, wherein the first detection unit detects the at least one or more subjects by using a subject detector machine-learned based on dictionary data corresponding to the subject type.

3. The image pickup apparatus according to claim 2, wherein the subject detector includes at least one or more subject detectors machine-learned based on the respective dictionary data of the subject types, and the first detection unit performs detection of the subject of the subject type, in which the at least one or more subject detectors are used, by using time division.

4. The image pickup apparatus according to claim 2, wherein the second detection unit detects a subject from the multiple-exposure image by using a subject detector machine-learned based on dictionary data corresponding to the determined subject type.

5. The image pickup apparatus according to claim 1, wherein the first detection unit performs detection by means of template matching corresponding to the at least one or more subjects.

6. The image pickup apparatus according to claim 5, wherein the second detection unit detects a subject from the multiple-exposure image by means of template matching corresponding to the determined subject type.

7. The image pickup apparatus according to claim 1, wherein the instructions, when executed by the processor, cause the processor to further function as:

a reduction unit to reduce a size of an image to be detected by the first detection unit to an image size smaller than that of the multiple-exposure image.

8. A control method for an image pickup apparatus that comprises an acquisition unit configured or programmed to acquire images of a plurality of frames and a synthesis unit configured or programmed to synthesize the images of the plurality of frames to generate a multiple-exposure image, the control method comprising:

a first detection step of detecting at least one or more subjects with respect to at least one of the images of the plurality of frames, the first detection step including a subject type judgement step of judging a subject type of the at least one or more subjects;

a determination step of determining a subject type of a main subject of the multiple-exposure image based on a detection result obtained in the first detection step including determining one of the subject types of the at least one or more subjects judged in the subject type judgement step as the subject type of the main subject of the multiple exposure image, and in a case that a priority subject type set by a user does not exist among the subject types of the at least one or more subjects judged in the subject type judgement step, determining the subject type of the main subject of the multiple-exposure image in response to a subject position of the at least one or more subjects; and a second detection step of detecting a subject of the determined subject type with respect to the multiple-exposure image.

9. A non-transitory computer-readable storage medium storing a program for causing a computer to execute a control method for an image pickup apparatus that comprises an acquisition unit configured or programmed to acquire images of a plurality of frames and a synthesis unit configured or programmed to synthesize the images of the plurality of frames to generate a multiple-exposure image, the control method comprising:

a first detection step of detecting at least one or more subjects with respect to at least one of the images of the plurality of frames, the first detection step including a subject type judgement step of judging a subject type of the at least one or more subjects;

a determination step of determining a subject type of a main subject of the multiple-exposure image based on a detection result obtained in the first detection step including determining one of the subject types of the at least one or more subjects judged in the subject type judgement step as the subject type of the main subject of the multiple-exposure image, and in a case that a priority subject type set by a user does not exist among the subject types of the at least one or more subjects judged in the subject type judgement step, determining the subject type of the main subject of the multiple-exposure image in response to a subject position of the at least one or more subjects; and a second detection step of detecting a subject of the determined subject type with respect to the multiple-exposure image.

* * * * *